United States Patent
Andrivon et al.

(10) Patent No.: US 11,032,579 B2
(45) Date of Patent: Jun. 8, 2021

(54) METHOD AND A DEVICE FOR ENCODING A HIGH DYNAMIC RANGE PICTURE, CORRESPONDING DECODING METHOD AND DECODING DEVICE

(71) Applicant: INTERDIGITAL VC HOLDINGS, INC, Wilmington, DE (US)

(72) Inventors: Pierre Andrivon, Liffre (FR); Sebastien Lasserre, Thorigné Fouillard (FR); David Touze, Rennes (FR); Edouard Francois, Bourg des Comptes (FR)

(73) Assignee: InterDigital VC Holdings, Inc., Wilmington, DE (US)

(*) Notice: Subject to any disclaimer, the term of this patent is extended or adjusted under 35 U.S.C. 154(b) by 225 days.

(21) Appl. No.: 16/086,240

(22) PCT Filed: Mar. 13, 2017

(86) PCT No.: PCT/EP2017/055829
§ 371 (c)(1),
(2) Date: Sep. 18, 2018

(87) PCT Pub. No.: WO2017/157845
PCT Pub. Date: Sep. 21, 2017

(65) Prior Publication Data
US 2020/0296428 A1 Sep. 17, 2020

(30) Foreign Application Priority Data
Mar. 18, 2016 (EP) .................................... 16305303

(51) Int. Cl.
*G06T 5/00* (2006.01)
*G06T 9/00* (2006.01)
(Continued)

(52) U.S. Cl.
CPC .............. *H04N 19/98* (2014.11); *G06T 3/40* (2013.01); *G06T 5/007* (2013.01); *G06T 5/009* (2013.01);
(Continued)

(58) Field of Classification Search
CPC ...................... G06T 3/40; G06T 5/009; G06T 2207/20208; G06T 5/007; H04N 19/186; H04N 19/98
See application file for complete search history.

(56) References Cited

U.S. PATENT DOCUMENTS 8,891,863 B2 11/2014 Ninan et al.
9,978,130 B2 5/2018 Sun
(Continued)

FOREIGN PATENT DOCUMENTS

CN 102741883 A 12/2012
CN 103069809 A 4/2013
(Continued)

OTHER PUBLICATIONS

Banterle et al ("High Dynamic Range Imaging and Low Dynamic Range Expansion for Generating HDR Content," Eurographics 2009, Computer Graphics Forum, vol. 28, No. 8) (Year: 2009).*
(Continued)

*Primary Examiner* — Yubin Hung
(74) *Attorney, Agent, or Firm* — Xiaoan Lu

(57) ABSTRACT

A decoding method is disclosed that comprises:—decoding (S120) a stream to obtain a decoded standard dynamic range picture and colour metadata associated with the standard dynamic range picture, wherein the colour metadata are representative at least of characteristics of a high dynamic range picture associated with the standard dynamic range picture; and—reconstructing (S130) a high dynamic range access the input stream(s) picture from the decoded standard dynamic range picture and from the colour metadata.

21 Claims, 6 Drawing Sheets

(51) Int. Cl.
  H04N 19/186 (2014.01)
  H04N 19/98 (2014.01)
  G06T 3/40 (2006.01)

(52) U.S. Cl.
  CPC ............ *G06T 9/00* (2013.01); *H04N 19/186* (2014.11); *G06T 2207/20208* (2013.01)

(56) References Cited

U.S. PATENT DOCUMENTS

| | | | |
|---|---|---|---|
| 10,158,835 | B2 | 12/2018 | Gish et al. |
| 10,687,080 | B2* | 6/2020 | Minoo .................. H04N 1/603 |
| 2013/0177240 | A1 | 7/2013 | Thoma et al. |
| 2014/0105289 | A1 | 4/2014 | Su et al. |
| 2015/0042890 | A1* | 2/2015 | Messmer ................ H04N 5/20 348/725 |
| 2015/0103919 | A1* | 4/2015 | Hattori .................. H04N 19/30 375/240.25 |
| 2016/0203618 | A1* | 7/2016 | Li ........................... G06T 5/009 345/591 |
| 2016/0292834 | A1* | 10/2016 | Tsuru ...................... H04N 9/69 |
| 2016/0301959 | A1* | 10/2016 | Oh ................. H04N 21/234327 |
| 2017/0064334 | A1* | 3/2017 | Minoo ..................... H04N 1/64 |
| 2017/0103729 | A1* | 4/2017 | Huang ..................... H04N 9/68 |
| 2017/0186141 | A1* | 6/2017 | Ha ......................... H04N 9/646 |
| 2017/0347113 | A1* | 11/2017 | De Haan ................ G06F 17/10 |
| 2017/0374313 | A1* | 12/2017 | Oh ..................... H04N 21/4348 |
| 2018/0041784 | A1* | 2/2018 | Ho ......................... H04N 21/84 |
| 2019/0130542 | A1* | 5/2019 | Tichelaar ................ G06T 5/007 |

FOREIGN PATENT DOCUMENTS

| | | |
|---|---|---|
| RU | 2571612 C2 | 12/2015 |
| WO | WO2013046095 | 4/2013 |
| WO | WO2014178286 A1 | 11/2014 |
| WO | WO2015189350 | 12/2015 |
| WO | WO2015193112 | 12/2015 |
| WO | WO2017157977 A1 | 9/2017 |

OTHER PUBLICATIONS

Segall, Andrew ("Scalable Coding of High Dynamic Range Video," IEEE International Conference on Image Processing, Sep. 16-Oct. 19, 2007) (Year: 2007).*

Boitard et al. ("Chroma scaling for high dynamic range video compression," IEEE International Conference on Acoustics, Speech and Signal Processing, Mar. 1, 2016) (Year: 2016).*

Reinhard et al. ("High Dynamic Range Video Production, Delivery and Rendering," SMPTE Motion Imaging Journal (vol. 124, Issue: 4, Oct. 26, 2015) (Year: 2015).*

Anonymous, "Parameter values for the HDTV standards for production and international program exchange", Recommendation ITU-R BT.709-5, International Telecommunications Union, BT Series, Broadcasting service (television), Apr. 2002, pp. 1-32.

Anonymous, "Parameters values for ultra-high definition television systems for production and international programme exchange", International Telecommunication Union, ITU-R Radiocommunication Sector of ITU, Recommendation ITU-R BT.2020-1, Jun. 2014, pp. 1-8.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2013, pp. 1-317.

Joshi et al., "High Efficiency Video Coding (HEVC) Screen Content Coding: Draft 5", Joint Collaborative Team on Video Coding (JCT-VC) of ITU-T SG 16 WP3 and ISO/IEC JTC 1/SC 29/WG 11, Document: JCTVC-V1005, 22nd Meeting, Geneva, Switzerland, Oct. 15, 2015, pp. 1-682.

Anonymous, "High Dynamic Range Electro-Optical Transfer Function of Mastering Reference Displays", Society of Motion Picture and Television Engineers, SMPTE ST 2084:2014, Aug. 16, 2014, pp. 1-15.

Joshi et al., "High Efficiency Video Coding (HEVC) Screen Content Coding: Draft 4", Joint Collaborative Team on Video Coding (JCT-VC) of ITU-T SG 16 WP3 and ISO/IEC JTC 1/SC 29/WG 11, Document: JCTVC-U1005_rl, 21st Meeting, Warsaw, Poland, Jun. 19, 2015, pp. 1-652.

Segall et al., "Tone Mapping SEI Message", Joint VIdeo Team (JVT) of ISO/IEC MPEG & ITU-T VCEG (ISO/IEC JTC1/SC29/WG11 and ITU-T SG16 Q.6), Document JVT-S087, Geneva, Switzerland, 19th Meeting, Apr. 1, 2006, pp. 1-12.

Zhang, "Research on tone mapping for high dynamic range images", Beijing Jiaotong University, Master Thesis, Research on Mapping Algorithm, Feb. 15, 2010, 67 pages.

Lasserre et al., "Modulation-based HDR video coding with SDR backward compatibility", Document: JCTVC-U0085r1, Joint Collaborative Team on Video Coding (JCT-VC) of ITU-T SG 16 WP 3 and ISO/IEC JTC 1/SC 29/WG 11, 21st Meeting: Warsaw, PL, pp. 1-16, Jun. 19-26, 2015.

Fogg et al., "Indication of SMPTE 2084 and 2085 and carriage of 2086 metadata in HEVC", Document: JCTVC-P0084r1, Joint Collaborative Team on Video Coding (JCT-VC) of ITU-T SG 16 WP 3 and ISO/IEC JTC 1/SC 29/WG 11, 16th Meeting: San Jose, US, pp. 1-5, Jan. 9-17, 2014.

Haan et al., "HDR CE6: Core Experiments 4.3 and 4.6a: description of the Philips system in 4:2:0 and with automatic reshaper parameter derivation", Document: JCTVC—W0063, Joint Collaborative Team on Video Coding (JCT-VC) of ITU-T SG 16 WP 3 and ISO/IEC JTC 1/SC 29/WG 11 23rd Meeting: San Diego, USA, pp. 1-13, Feb. 19-26, 2016.

* cited by examiner

METHOD AND A DEVICE FOR ENCODING A HIGH DYNAMIC RANGE PICTURE, CORRESPONDING DECODING METHOD AND DECODING DEVICE

This application claims the benefit, under 35 U.S.C. § 365 of International Application PCT/EP2017/055829, filed Mar. 13, 2017, which was published in accordance with PCT Article 21(2) on Sep. 21, 2017, in English, and which claims the benefit of European Patent Application No. 16305303.6, filed Mar. 18, 2016.

1. TECHNICAL FIELD

In the following, a method and a device for encoding a high dynamic range picture are disclosed. Corresponding decoding method and decoding device are further disclosed.

2. BACKGROUND ART

In the following, a color picture contains several arrays of samples (pixel values) in a specific picture/video format which specifies all information relative to the pixel values of a picture (or a video) and all information which may be used by a display and/or any other device to visualize and/or decode a picture (or video) for example. A color picture comprises at least one component, in the shape of a first array of samples, usually a luma (or luminance) component, and at least one another component, in the shape of at least one other array of samples. Or, equivalently, the same information may also be represented by a set of arrays of color samples (color components), such as the traditional tri-chromatic RGB representation.

A pixel value is represented by a vector of n values, where n is the number of components. Each value of a vector is represented with a number of bits which defines a maximal dynamic range of the pixel values.

Standard-Dynamic-Range pictures (SDR pictures) are color pictures whose luminance values are represented with a limited dynamic usually measured in power of two or f-stops. SDR pictures have a dynamic around 10 fstops, i.e. a ratio 1000 between the brightest pixels and the darkest pixels in the linear domain, and are coded with a limited number of bits (most often 8 or 10 in HDTV (High Definition Television systems) and UHDTV (Ultra-High Definition Television systems) in a non-linear domain, for instance by using the ITU-R BT.709 OEFT (Optico-Electrical-Transfer-Function) (Rec. ITU-R BT.709-5, April 2002) or ITU-R BT.2020 OETF (Rec. ITU-R BT.2020-1, June 2014) to reduce the dynamic. This limited non-linear representation does not allow correct rendering of small signal variations, in particular in dark and bright luminance ranges. In High-Dynamic-Range pictures (HDR pictures), the signal dynamic is much higher (up to 20 f-stops, a ratio one million between the brightest pixels and the darkest pixels) and a new non-linear representation is needed in order to maintain a high accuracy of the signal over its entire range. In HDR pictures, raw data are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

A color gamut is a certain complete set of colors. The most common usage refers to a set of colors which can be accurately represented in a given circumstance, such as within a given color space or by a certain output device. A color gamut is sometimes defined by RGB primaries defined in the CIE1931 color space chromaticity diagram and a white point.

For example, a color gamut is defined by a RGB ITU-R Recommendation BT.2020 color space for UHDTV. An older standard, ITU-R Recommendation BT.709, defines a smaller color gamut for HDTV. In SDR, the dynamic range is defined officially up to 100 nits (candela per square meter) for the color volume in which data are coded, although some display technologies may show brighter pixels.

High Dynamic Range pictures (HDR pictures) are color pictures whose luminance values are represented with a HDR dynamic that is higher than the dynamic of a SDR picture.

The HDR dynamic is not yet defined by a standard but one may expect a dynamic range up to a few thousands nits. For instance, a HDR color volume is defined by a RGB BT.2020 color space and the values represented in said RGB color space belong to a dynamic range from 0 to 4000 nits. Another example of HDR color volume is defined by a RGB BT.2020 color space and the values represented in said RGB color space belong to a dynamic range from 0 to 1000 nits.

Color-grading a picture (or a video) is a process of altering/enhancing the colors of the picture (or the video). Usually, color-grading a picture involves a change of the color volume (color space and/or dynamic range) or a change of the color gamut relative to this picture. Thus, two different color-graded versions of a same picture are versions of this picture whose values are represented in different color volumes (or color gamut) or versions of the picture whose at least one of their colors has been altered/enhanced according to different color grades. This may involve user interactions.

For example, in cinematographic production, a picture and a video are captured using tri-chromatic cameras into RGB color values composed of 3 components (Red, Green and Blue). The RGB color values depend on the tri-chromatic characteristics (color primaries) of the sensor. A first color-graded version of the captured picture is then obtained in order to get theatrical renders (using a specific theatrical grade). Typically, the values of the first color-graded version of the captured picture are represented according to a standardized YUV format such as BT.2020 which defines parameter values for UHDTV.

Then, a Colorist, usually in conjunction with a Director of Photography, performs a control on the color values of the first color-graded version of the captured picture by fine-tuning/tweaking some color values in order to instill an artistic intent.

The problem to be solved is the distribution of a compressed HDR picture (or video) while, at the same time, distributing an associated SDR picture (or video) representative of a color-graded version of said HDR picture (or video).

A trivial solution is simulcasting both SDR and HDR picture (or video) on a distribution infrastructure but the drawback is to virtually double the needed bandwidth compared to a legacy infrastructure distributing adapted to broadcast SDR picture (or video) such as HEVC main 10 profile ("*High Efficiency Video Coding*", *SERIES H: AUDIOVISUAL AND MULTIMEDIA SYSTEMS, Recommendation ITU-T H.265, Telecommunication Standardization Sector of ITU*, April 2013).

Using a legacy distribution infrastructure is a requirement to accelerate the emergence of the distribution of HDR pictures (or video). Also, the bitrate shall be minimized while ensuring good quality of both SDR and HDR version of the picture (or video).

Moreover, backward compatibility may be ensured, i.e. the SDR picture (or video) shall be viewable for users equipped with legacy decoder and display, i.e. in particular, overall perceived brightness (i.e. dark vs. bright scenes) and perceived colors (for instance, preservation of hues, etc.) should be preserved.

Another straightforward solution is to reduce the dynamic range of the HDR picture (or video) by a suitable non-linear function, typically into a limited number of bits (say 10 bits), and directly compressed by the HEVC main10 profile. Such non-linear function (curve) already exists like the so-called PQ EOTF proposed by Dolby at SMPTE (*SMPTE standard: High Dynamic Range Electro-Optical Transfer Function of Mastering Reference Displays, SMPTE ST* 2084:2014).

The drawback of this solution is the lack of backward compatibility, i.e. the obtained reduced version of the picture (video) has not a sufficient visual quality to be considered as being viewable as a SDR picture (or video), and compression performance are somewhat poor.

3. BRIEF SUMMARY

A decoding method is disclosed that comprises:
decoding a stream to obtain a decoded standard dynamic range picture and colour metadata associated with the standard dynamic range picture, wherein the colour metadata are representative at least of characteristics of a high dynamic range picture associated with the standard dynamic range picture;
reconstructing a high dynamic range picture from the decoded standard dynamic range picture and from the colour metadata.

A coding method is disclosed that comprises:
determining an standard dynamic range picture from a high dynamic range picture;
obtaining colour metadata representative of characteristics of the high dynamic range picture;
encoding in a stream the standard dynamic range picture and the colour metadata.

A stream is disclosed that comprises coded data representative of a standard dynamic range picture and coded data representative of colour metadata associated with the standard dynamic range picture, wherein the colour metadata are representative at least of characteristics of a high dynamic range picture associated with the standard dynamic range picture A decoding device is also disclosed that comprises:
means for decoding a stream to obtain a decoded standard dynamic range picture and colour metadata associated with the standard dynamic range picture, wherein the colour metadata are representative at least of characteristics of a high dynamic range picture associated with the standard dynamic range picture;
means for reconstructing an high dynamic range picture from the decoded standard dynamic range picture and from the colour metadata.

A coding device is also disclosed that comprises:
means for determining an standard dynamic range picture from a high dynamic range picture;
means for obtaining colour metadata representative of characteristics of the high dynamic range picture;
means for encoding in a stream the standard dynamic range picture and the colour metadata.

A decoding device is disclosed that comprises a communication interface configured to access at least a stream and at least one processor configured to:
decode the accessed stream to obtain a decoded standard dynamic range picture and colour metadata associated with the standard dynamic range picture, wherein the colour metadata are representative at least of characteristics of a high dynamic range picture associated with the standard dynamic range picture;
reconstruct a high dynamic range picture from the decoded standard dynamic range picture and from the colour metadata.

A coding device is disclosed that comprises a communication interface configured to access at least a high dynamic range picture and at least one processor configured to:
determining a standard dynamic range picture from the accessed high dynamic range picture;
obtain colour metadata representative of characteristics of the high dynamic range picture;
encode in a stream the standard dynamic range picture and the colour metadata.

According to a specific characteristic, colour metadata are representative at least of characteristics of a mastering display used in mastering the high dynamic range picture associated with the standard dynamic range picture.

Advantageously, the colour metadata are encapsulated in a Mastering Display Colour Volume SEI message associated with the standard dynamic range picture.

According to a specific characteristic, the characteristics of a mastering display identify a color volume of the mastering display.

Advantageously, the characteristics of a mastering display comprises at least colour primaries, a white point, and a luminance range.

In a variant, the colour metadata are representative at least of characteristics of a content light level of the high dynamic range picture.

Advantageously, the colour metadata are encapsulated in a Content Light Level information SEI message associated with the standard dynamic range picture.

4. BRIEF SUMMARY OF THE DRAWINGS

5. DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another. In the following sections, an image block is composed of samples associated with sample values, e.g. luma samples or chroma samples, etc.

In the following, the word "reconstructed" and "decoded" can be used interchangeably.

Figure 1:
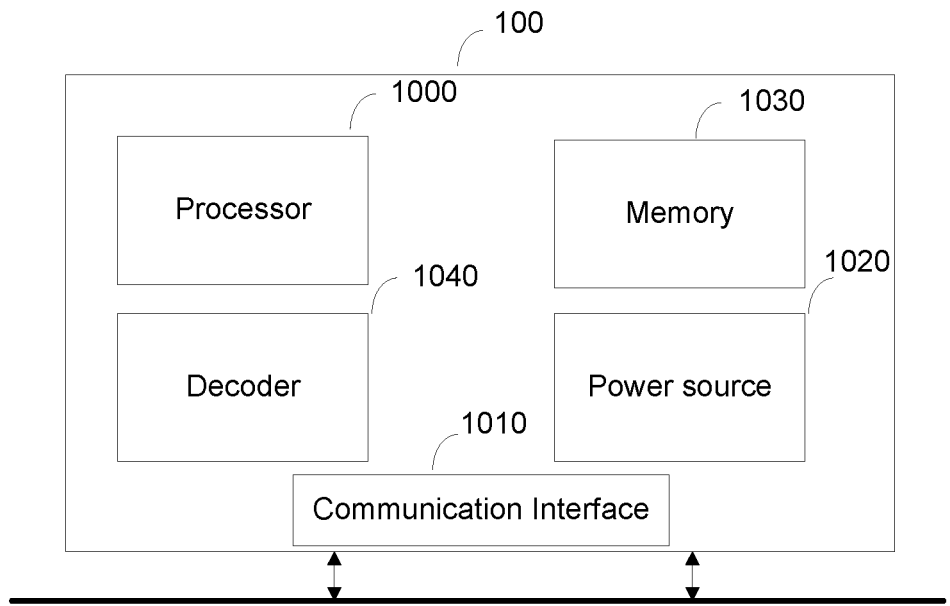
FIG. 1 represents an exemplary architecture of a receiver configured to decode a stream in order to obtain a HDR image according to a non-limiting embodiment.

FIG. 1 represents an exemplary architecture of a receiver 100 configured to decode a stream in order to obtain a HDR image according to a non-limiting embodiment.

The receiver 100 comprises one or more processor(s) 1000, which could comprise, for example, a CPU, a GPU and/or a DSP (English acronym of Digital Signal Processor), along with internal memory 1030 (e.g. RAM, ROM and/or EPROM). The receiver 100 comprises one or more communication interface(s) 1010 (e.g. a keyboard, a mouse, a touchpad, a webcam), each adapted to display output information and/or allow a user to enter commands and/or data (e.g. the HDR image); and a power source 1020 which may be external to the receiver 100. The receiver 100 may also comprise one or more network interface(s) (not shown). The decoder module 1040 represents the module that may be included in a device to perform the decoding functions. Additionally, the decoder module 1040 may be implemented as a separate element of the receiver 100 or may be incorporated within processor(s) 1000 as a combination of hardware and software as known to those skilled in the art.

The stream may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the HDR image may be sent to a destination, e.g. a display device. As an example, the HDR image is stored in a remote or in a local memory, e.g. a video memory or a RAM, a hard disk. In a variant, the HDR image is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 100 further comprises a computer program stored in the memory 1030. The computer program comprises instructions which, when executed by the receiver 100, in particular by the processor 1000, enable the receiver to execute the decoding method described with reference to FIG. 2 or to FIG. 6. According to a variant, the computer program is stored externally to the receiver 100 on a non-transitory digital data support, e.g. on an external storage medium such as a HDD, CD-ROM, DVD, a read-only and/or DVD drive and/or a DVD Read/Write drive, all known in the art. The receiver 100 thus comprises a mechanism to read the computer program. Further, the receiver 100 could access one or more Universal Serial Bus (USB)-type storage devices (e.g., "memory sticks.") through corresponding USB ports (not shown).

According to exemplary and non-limiting embodiments, the receiver 100 can be, but is not limited to:
- a mobile device;
- a communication device;
- a game device;
- a set top box;
- a TV set;
- a tablet (or tablet computer);
- a laptop;
- a video player, e.g. a Blu-ray player, a DVD player;
- a display and
- a decoding chip or decoding device.

Figure 2:
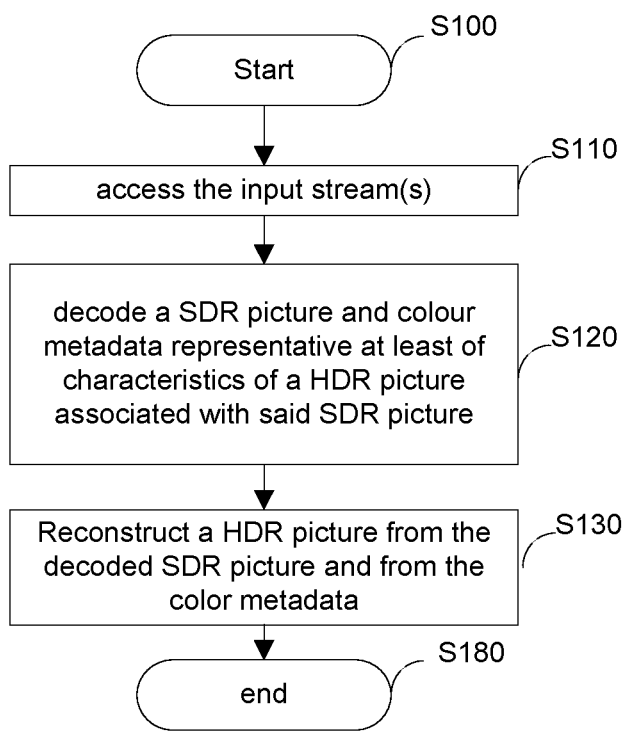
FIG. 2 represents a flowchart of a method for decoding a stream to reconstruct an HDR image according to a specific and non-limiting embodiment.

FIG. 2 represents a flowchart of a method for decoding a stream to reconstruct an HDR image according to a specific and non-limiting embodiment.

The method starts at step S100. At step S110, a receiver accesses a stream, e.g. an HEVC compliant stream. At step S120, the receiver decodes a SDR picture and colour metadata from the stream. The colour metadata are representative at least of characteristics of a high dynamic range picture associated with the standard dynamic range picture.

In a first specific embodiment, the colour metadata are representative of characteristics of a mastering display used in mastering the HDR picture associated with the SDR picture. As an example, the colour metadata are encapsulated in a Mastering Display Colour Volume SEI message associated with the SDR picture. Such a SEI message is for example disclosed in sections D2.28 and D3.28 of the document JCTVC-V1005-v1 entitled "High Efficiency Video Coding (HEVC) Screen Content Coding: Draft 5"

| mastering_display_colour_volume( payloadSize ) { | Descriptor |
|---|---|
| for( c = 0; c < 3; c++ ) { | |
|   display_primaries_x[ c ] | u(16) |
|   display_primaries_y[ c ] | u(16) |
| } | |
| white_point_x | u(16) |
| white_point_y | u(16) |
| max_display_mastering_luminance | u(32) |
| min_display_mastering_luminance | u(32) |
| } | | display_primaries_x[ c ] and display_primaries_y[ c ] specify the normalized x and y chromaticity coordinates, respectively, of the colour primary component c of the mastering display.

white_point_x and white_point_y specify the normalized x and y chromaticity coordinates, respectively, of the white point of the mastering display.

max_display_mastering_luminance and min_display_mastering_luminance specify the nominal maximum and minimum display luminance, respectively, of the mastering display.

max_display_mastering_luminance and min_display_mastering_luminance thus specify a luminance range.

This SEI message identifies the colour volume (the colour primaries, white point and luminance range—i.e. max and min luminance values) of a display considered to be the mastering display for the associated video content—e.g., the colour volume of a display that was used for viewing while authoring the video content. The described mastering display is a three-colour additive display system that has been configured to use the indicated mastering colour volume. In such a case the SDR picture is the associated video content. Indeed, the SDR picture is considered to be in the coded layer-wise video sequence (CLVS). The CLVS is a sequence of pictures and the associated non-VCL NAL units of the base layer of a coded video sequence (CVS). However, according to the present principles the SEI message is used in a different way to transmit the colour volume (the colour primaries, white point and luminance range) of a display considered to be the mastering display for the HDR picture which is not the one encoded in the stream and thus not in the CLVS. This makes it possible to use existing syntax elements to transmit data relevant for HDR reconstruction.

In a variant, the colour metadata are encapsulated in user data, such as a user data SEI message or in an existing SEI user data registered.

In a second specific embodiment, the colour metadata are representative of a content light level of the high dynamic range picture.

As an example, the colour metadata are encapsulated in a Content Light Level information SEI message associated with the SDR picture. Such a message is for example disclosed in sections D2.35 and D3.35 of the document JCTVC-V1005-v1 entitled "High Efficiency Video Coding (HEVC) Screen Content Coding: Draft 5".

| content_light_level_info( payloadSize ) { | Descriptor |
|---|---|
| max_content_light_level | u(16) |
| max_pic_average_light_level | u(16) |
| } | | max_content_light_level, when not equal to 0, indicates an upper bound on the maximum light level among all individual samples in a 4:4:4 representation of red, green, and blue colour primary intensities (in the linear light domain) for the pictures of the CLVS.

max_pic_average_light_level, when not equal to 0, indicates an upper bound on the maximum average light level among the samples in a 4:4:4 representation of red, green, and blue colour primary intensities (in the linear light domain) for any individual picture of the CLVS.

This SEI message identifies upper bounds for the nominal target brightness light level of the pictures of the CLVS.

The first and second embodiments may be combined, i.e. the colour metadata may comprise two parts: a first part being representative of characteristics of a mastering display used in mastering a HDR picture associated with the SDR picture (possibly encapsulated in the MDCV SEI message) and a second part being representative of a content light level of the high dynamic range picture associated with the SDR picture (possibly encapsulated in a CLL SEI message).

At step S130, the receiver reconstructs a HDR picture from the decoded SDR picture and from the colour metadata. Different embodiments of the HDR picture reconstruction step are disclosed with reference to FIGS. 5 to 8. In an exemplary embodiment, reconstructing the HDR picture from the decoded SDR picture and the colour metadata comprises:

inverse mapping (step 222 of FIG. 6, step 220 of FIG. 7, steps 1231 and 1210 of FIG. 8) of the luma signal of the decoded SDR picture to obtain a HDR luminance signal responsive at least to the max luminance of the mastering display used in mastering the HDR picture and/or to the maximum content light level of the HDR picture;

color correction (step 221 of FIG. 6, step 1221 of FIG. 8) of the chroma signal of the decoded SDR picture responsive at least to the max luminance of the mastering display used in mastering the HDR picture and/or to the maximum content light level of the HDR picture and/or to the color primaries and white point of the mastering display used in mastering the HDR picture;

reconstructing (step 230 of FIG. 7, steps 1222, 1223, 1224 of FIG. 8) the HDR picture from the obtained HDR luminance signal and the corrected chroma signal.

In another exemplary embodiment, reconstructing the HDR picture from the decoded SDR picture and the colour metadata comprises inverse mapping (23 on FIG. 6) a luma signal of the decoded version of the standard dynamic range picture responsive to at least a maximum display luminance of said mastering display to obtain a high dynamic range luminance signal and further an inverse color mapping (22 on FIG. 6) of the decoded version of the standard dynamic range picture responsive to at least one of said maximum display luminance of said mastering display and color primaries and white point of said mastering display. The method ends at step S180.

Figure 3:
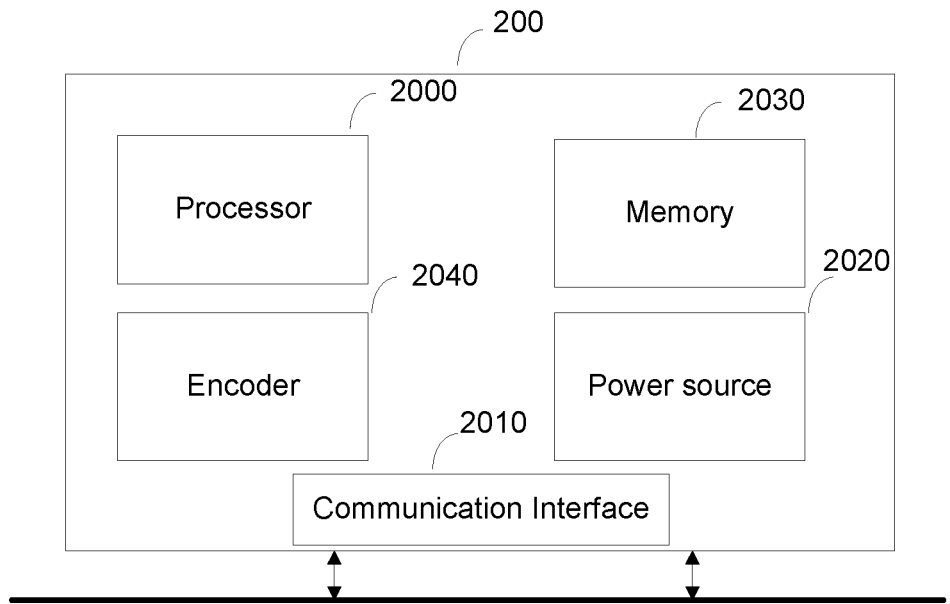
FIG. 3 represents an exemplary architecture of a transmitter 100 configured to encode a HDR image in a stream according to a non-limiting embodiment.

FIG. 3 represents an exemplary architecture of a transmitter 100 configured to encode a HDR image in a stream according to a non-limiting embodiment.

The transmitter 200 comprises one or more processor(s) 2000, which could comprise, for example, a CPU, a GPU and/or a DSP (English acronym of Digital Signal Processor), along with internal memory 2030 (e.g. RAM, ROM, and/or EPROM). The transmitter 200 comprises one or more communication interface(s) 2010 (e.g. a keyboard, a mouse, a touchpad, a webcam), each adapted to display output information and/or allow a user to enter commands and/or data (e.g. a stream); and a power source 2020 which may be external to the transmitter 200. The transmitter 200 may also comprise one or more network interface(s) (not shown). Encoder module 2040 represents the module that may be included in a device to perform the coding functions. Additionally, encoder module 2040 may be implemented as a separate element of the transmitter 200 or may be incorporated within processor(s) 2000 as a combination of hardware and software as known to those skilled in the art.

The HDR image may be obtained from a source. According to different embodiments, the source can be, but is not limited to:

a local memory, e.g. a video memory, a RAM, a flash memory, a hard disk;

a storage interface, e.g. an interface with a mass storage, a ROM, an optical disc or a magnetic support;

a communication interface, e.g. a wireline interface (for example a bus interface, a wide area network interface, a local area network interface) or a wireless interface (such as a IEEE 802.11 interface or a Bluetooth interface); and an image capturing circuit (e.g. a sensor such as, for example, a CCD (or Charge-Coupled Device) or CMOS (or Complementary Metal-Oxide-Semiconductor)).

According to different embodiments, the stream may be sent to a destination. As an example, the stream is stored in a remote or in a local memory, e.g. a video memory or a RAM, a hard disk. In a variant, the stream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 200 further comprises a computer program stored in the memory 2030. The computer program comprises instructions which, when executed by the transmitter 200, in particular by the processor 2000, enable the transmitter 200 to execute the encoding method described with reference to FIG. 8 or 9.

According to a variant, the computer program is stored externally to the transmitter 200 on a non-transitory digital data support, e.g. on an external storage medium such as a HDD, CD-ROM, DVD, a read-only and/or DVD drive and/or a DVD Read/Write drive, all known in the art. The transmitter 200 thus comprises a mechanism to read the computer program. Further, the transmitter 200 could access one or more Universal Serial Bus (USB)-type storage devices (e.g., "memory sticks.") through corresponding USB ports (not shown).

According to exemplary and non-limiting embodiments, the transmitter 200 can be, but is not limited to:
a mobile device;
a communication device;
a game device;
a tablet (or tablet computer);
a laptop;
a still image camera;
a video camera;
an encoding chip or encoding device;
a still image server; and
a video server (e.g. a broadcast server, a video-on-demand server or a web server).

Figure 4:
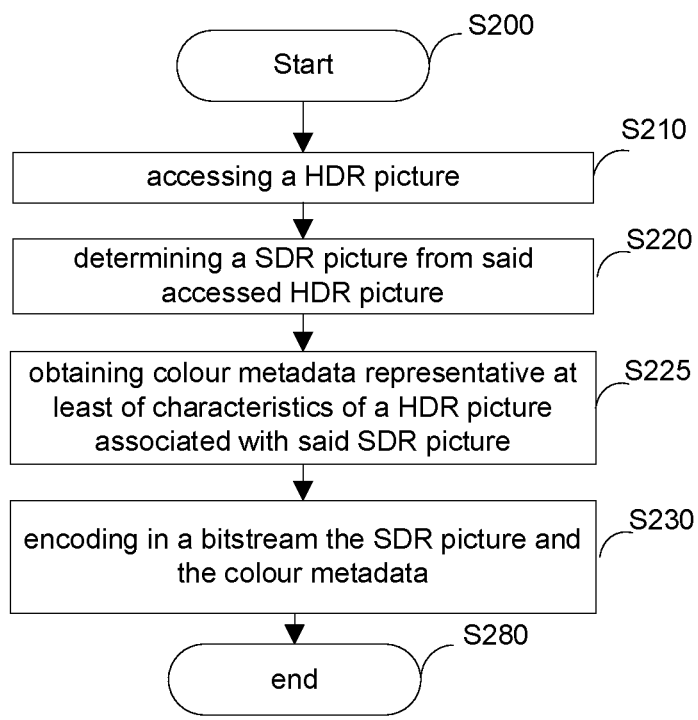
FIG. 4 represents a flowchart of a method for encoding a HDR image in a stream according to a specific and non-limiting embodiment.

FIG. 4 represents a flowchart of a method for encoding a HDR image in a stream according to a specific and non-limiting embodiment. This method is the inverse of the decoding method. All the embodiments disclosed with respect to the decoding method apply to the encoding method.

The method starts at step S200. At step S210, a transmitter accesses a HDR image. At step S220, the transmitter determine a SDR picture from the HDR picture. Various embodiments are disclosed with reference to FIGS. 9 to 12. In an exemplary embodiment, determining the SDR picture from the accessed HDR picture comprises:

mapping the luminance signal of the accessed HDR picture into a luma signal of the SDR picture (steps 1111 and 1113 of FIG. 12) responsive at least to the max luminance of the mastering display used in mastering the HDR picture and/or to the maximum content light level of the HDR picture;

derivation of a color correction factor β" from the luma signal of the SDR picture (step 1131 of FIG. 12), responsive at least to the max luminance of the mastering display used in mastering the HDR picture and/or to the maximum content light level of the HDR picture and to the color primaries and white point of the mastering display used in mastering the HDR picture;

mapping of the color signal of the HDR picture into a chroma signal of the SDR picture (steps 1121, 1122, 1123 of FIG. 12) responsive at least to the color primaries and white point of the mastering display used in mastering the HDR picture; and adjustment of the luma signal of the SDR picture with the chroma signal of the SDR picture (step 1133 of FIG. 12) responsive at least to the color primaries and white point of the mastering display used in mastering the HDR picture.

In another exemplary embodiment, determining the SDR picture from the accessed HDR picture comprises mapping (23 on FIG. 6) the luminance signal of the accessed HDR picture into a luma signal of the SDR picture (11 on FIG. 9) responsive at least to the max luminance of the mastering display used in mastering the HDR picture and further a color mapping (12 on FIG. 9) of the color signal of the HDR picture into a chroma signal of the SDR picture responsive to at least one of the maximum display luminance of the mastering display and color primaries and white point of the mastering display.

At step S225, the transmitter obtains colour metadata representative at least of characteristics of a high dynamic range picture associated with the standard dynamic range picture. As in the decoder, the color metadata may be representative of a mastering display used in mastering the HDR picture associated with the SDR picture and/or of a content light level of the high dynamic range picture associated with the SDR picture.

At step S230, the transmitter encodes the determined SDR picture and the obtained color metadata in a stream, e.g. in an HEVC compliant stream. The color metadata may be encapsulated in the SEI messages mentioned with respect to FIG. 2 for the decoding method.

The method ends at step S280.

Figure 5:
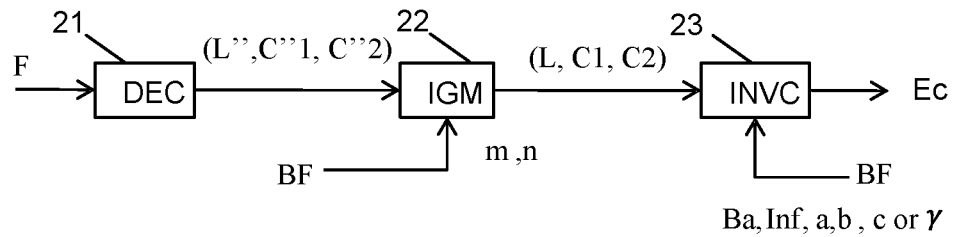
FIG. 5 represents a flowchart of a method for decoding a stream to reconstruct an HDR image according to another specific and non-limiting embodiment.

FIG. 5 represents a flowchart of a method for decoding a stream to reconstruct an HDR image according to another specific and non-limiting embodiment.

In step 21, a decoder DEC obtains a luminance component L" and two chrominance components C"1, C"2 either from a local or remote memory or by decoding at least partially a stream F. The stream F is representative of the SDR picture and of the color metadata (e.g. MDVC and/or CLL SEI message).

Figure 6:
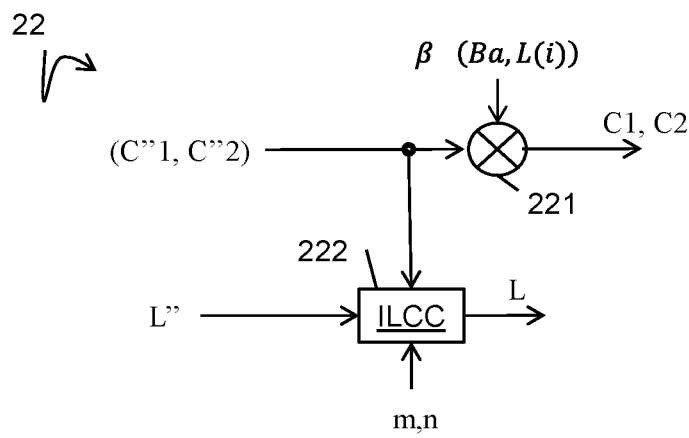
FIGS. 6 and 7 represent in details steps of FIG. 5.

In step 22, a module IGM obtains a final luminance component L and two final chrominance components C1, C2 from the luminance L" and chrominance C"1, C"2 components by applying an inverse mapping on the colors obtained from the luminance L" and chrominance C"1, C"2 components. FIG. 6 details step 22. A module ILCC obtains (step 222) the final luminance component L by linearly combining together the luminance component L" and the two chrominance components C"1, C"2, and the two final chrominance components C1, C2 are obtained by scaling (step 221) each of the two chrominance components C"1, C"2 by a factor β(L(i)) that depends on the value of each pixel i of the final luminance component L.

$$\begin{cases} L = L'' + mC_1'' + nC_2'' \\ C_1 = \beta(L(i)) * C_1'' \\ C_2 = \beta(L(i)) * C_2'' \end{cases} \quad (J)$$

where m and n are coefficient (real values). The coefficients m and n may be those obtained by the factorization of the matrix $\Phi_{Ba}(L)$ in equation (G), i.e. m and n are those obtained in $\Phi_0$. Consequently, they depend on the gamut of the HDR picture I (for instance BT.709 or BT.2020 gamut). Typical values for m and n are min in the interval [0.1,0.5]

According to a variant, the factor further depends on a modulation value Ba.

Equation (J) is considered as being an inverse mapping applies on the colors obtained from the luminance L" and chrominance C"1, C"2 components. Equation (J) is directly obtained from equation (A) applied on the encoder side that is considered as being a color mapping.

According to a variant of the module ILCC, the values of the final luminance component L are always higher than the values of the luminance component L":

$$L = L'' + \max(0, mC''_1 + nC''_2)$$

This embodiment is advantageous because it ensures that the final luminance component L does not exceed a potential clipping value that is usually used by the decoder to define a luminance peak. When a luminance peak is required by a decoder (e.g. given by the max_display_mastering_luminance syntax element of the MDCV SEI message) and when the final luminance component L is given by equation (J), the final luminance component L is clipped introducing some artefacts.

According to an embodiment, the modulation value Ba and/or the coefficients m and n are obtained from a remote or local memory such a Look-Up-Table, or from a stream BF.

According to an embodiment, the factor $\beta^{-1}(L(i))$ is obtained from a Look-Up-Table (LUT) for a specific value L(i) of the final luminance component L and, optionally further from a specific modulation value Ba and. Thus, for multiple luminance peak values (e.g. maximum luminance of the mastering display) such as for example, 1000, 1500 and 4000 nits, a specific factor $\beta^{-1}(L(i))$ is stored in a LUT for each specific modulation value Ba.

According to a variant, the factor $\beta^{-1}(L(i))$ for a specific modulation value Ba is obtained for a value of a pixel of the final luminance component L by interpolating the luminance peaks between the multiple luminance peaks for which LUT are stored.

Figure 7:
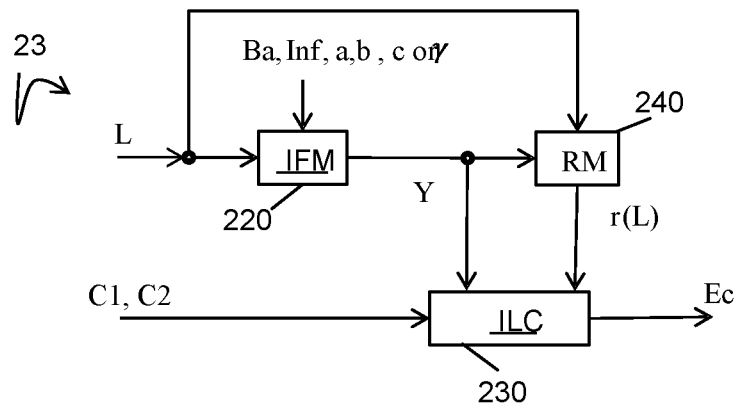

In step 23, a module INVC obtains at least one color component Ec of the color picture to be decoded from the final luminance L component and the two final chrominance C1, C2 components. The HDR picture is formed of the at least one color component Ec. FIG. 7 details step 23.

In step 220, a module IFM obtains a first component Y by applying a non-linear function $f^{-1}$ on the final luminance component L in order that the dynamic of the first component Y is increased compared to the dynamic of the final luminance component L:

$$Y = f^{-1}(Ba, L) \tag{A3}$$

The non-linear function $f^{-1}$ is the inverse of a non-linear function f applied on the transmitter side.

Thus, the embodiments of the function $f^{-1}$ are defined according to the embodiments of the function f.

According to an embodiment, the parameters of the non-linear function $f^{-1}$ (such as a, b, c or γ) and/or the information data Inf is (are) obtained from a local or remote memory (for example the non-linear function is built from a Look-Up Table indexed by a maximum luminance of the mastering display, and/or from the maximum luminance of the HDR picture, and/or from the color primaries and white point of the mastering display used in mastering the HDR picture) and/or from a stream BF.

According to an embodiment, the luminance component L is multiplied by the modulation value Ba after having applied the non-linear function $f^{-1}$:

$$Y = Ba * f^{-1}(L) \tag{A4}$$

According to an embodiment, the non-linear function $f^{-1}$ is the inverse of a gamma function.

The component Y is then given by:

$$Y_1 = \frac{L^{1/\gamma}}{B}$$

where $Y_1$ equals Y or Y/Ba according to the embodiments of eq. (A3) or (A4), B is a constant value, γ is a parameter (real value strictly below 1).

According to an embodiment, the non-linear function $f^{-1}$ is the inverse of a S-Log function. The component $Y_1$ is then given by:

$$Y_1 = \exp\left(\frac{L-c}{a}\right) - b$$

According to an embodiment, the non-linear function f is the inverse of either a gamma correction or a SLog correction according to the pixel values of the component Y. This is indicated by the information data Inf.

In step 230, a module ILC obtains at least one color component Ec from the first component Y, the two final chrominance components C1, C2, and from a factor r(L) that depends on the final luminance component L. The decoded color picture is then obtained by combining together the at least one color component Ec. The factor r(L) is determined by a module RM in a step 240.

Figure 8:
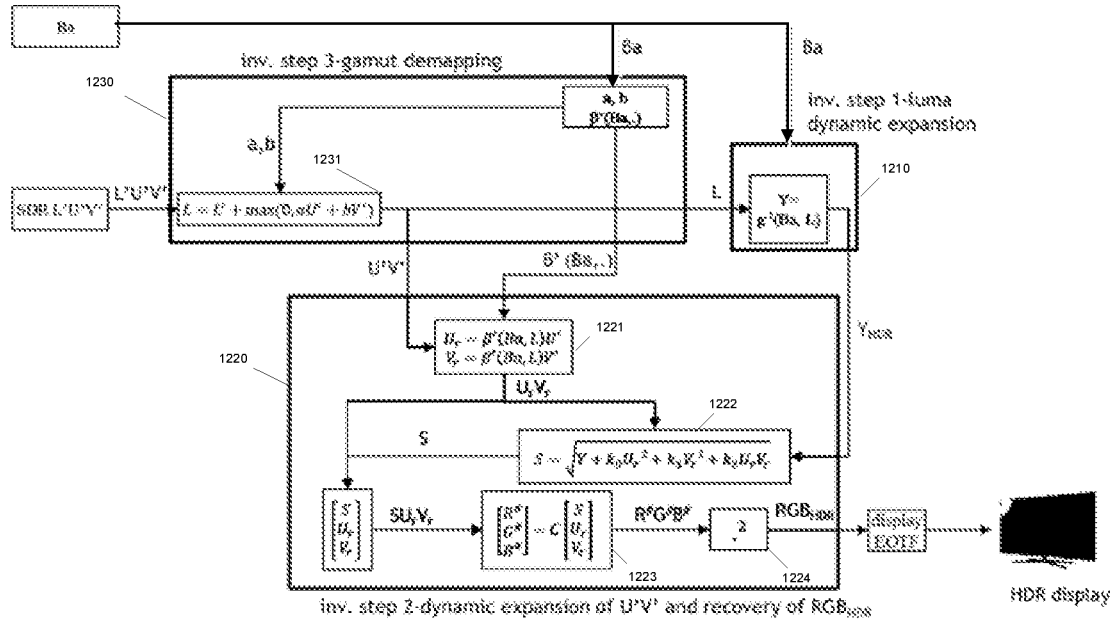
FIG. 8 represents a flowchart of a method for decoding a stream to reconstruct an HDR image according to another specific and non-limiting embodiment.

FIG. 8 represents a flowchart of a method for decoding a stream to reconstruct an HDR image according to another specific and non-limiting embodiment. This decoding method depends on a set of two-variable functions β'(Ba,L) and $g^{-1}$(Ba,L) and of two constant parameters a and b that are used for the mapping from SDR to HDR of the luminance and the chrominance such that colors, as well as texture, are preserved in the SDR image/video compared to the original HDR image/video. While g(Ba, L) is preferably a Slog function in the variable L, the triplet (a, b, β') is optimized to lead to the best possible SDR/HDR color matching (hue and perceived saturation) depending on the peak luminance, the input/output gamut's, and the backlight value Ba.

The encoding involves the function β"(Ba,L), and the decoding involves the function β'(Ba,L). The function β" is usually optimized on the encoder side. On the decoder side the functions β' are usually also stored as Look-Up Tables indexed by the peak luminance, the input/output gamut's, and possibly the backlight value Ba.

In step 1230, corrected luminance and chrominance components L', U', V' are obtained from the stream F. In a sub step, the luminance component L is obtained by inversing the correction, i.e. by the following equations $$L = L' + aU' + bV'$$

(a and b are the parameters 3 and n respectively shown in the FIG. 6)

According to a variant of the inverse correction, the values of the luminance component L are always higher than the values of the corrected luminance component L':

$$L = L' + \max(0, aU' + bV')$$

This embodiment is advantageous because it ensures that the luminance component L does not exceed a potential clipping value that is usually used by the decoder to define a luminance peak.

In step 1210, a nonlinear dynamic expansion function is applied to the luminance L in order to generate a first component which is an expanded range luminance, which is an inverse of a dynamic reduction function that has been applied to an original luminance component obtained when encoding the color picture, e.g. YHDR=$f^{-1}(L_{SDR})$, more precisely $g^{-1}(Ba, L)$.

In step 1220, at least one color components Ec (in the shown example $RGB_{HDR}$) of the HDR picture to be decoded are recovered from the corrected chrominance components U', V' and the first component Y (or sqrt(Y)). In a sub-step 1221 a multiplication of the corrected chrominance components U', V' by a common multiplicative factor β' is performed to obtain the intermediate chrominance components, which are used in a further sub-step 1222 for obtaining a second component $S := \sqrt{Y + k_0 U_r^2 + k_1 V_r^2 + k_2 U_r V_r}$. In a further sub-step 223, R#G#B# are recovered from $SU_r V_r$: $[R\#; G\#; B\#] = \text{Mat}_{3\times 3} [S; U_r; V_r]$. The color components of the decoded color picture $RGB_{HDR}$ are determined in a next sub-step 1224 as the squares of R#G#B#.

In other words, the method allows, for example, a SDR to HDR de-mapping that recovers R#G#B# representative of the RGB HDR components, from a SDR luma component L and two SDR chroma components UV, wherein a HDR luminance component Y is deduced from L, a value T is computed as a linear combination of $U^2$, $V^2$ and U*V, S is computed as the square root of Y–T and R#G#B# is then determined as the product of a 3×3 matrix and SUV, applied to each pixel of an input SDR picture. The 3×3 matrix is, for example, the inverse of the RGB→YUV matrix defined in ITU-R BT709/2020, i.e. $C = A^{-1}$.

The described decoding scheme allows the distribution of a compressed HDR picture while, at the same time, distributing an associated SDR picture representative of a color-graded version of the HDR picture. By construction, in order to get a decoder that is the exact inverse of the encoder β'=1/β". As a consequence, for a given couple (a,b), the determination of β" is sufficient to define both the encoder end the decoder.

The problem to solve is to find β" such that SDR L'U"V" colors correspond at best to the input HDR colors (hue and perceived saturation) and the process is decodable, i.e. the scaling by β" avoids clipping in U"V" as best as possible. In a specific implementation, β" is determined on the encoder for different values of the nominal maximum display luminance of the mastering display or of upper bound on the maximum light level among all individual samples of the HDR picture and for different color gamuts of the HDR picture (primaries and white point). Therefore, on the decoder side, LUTs of β' values are preferentially stored in the decoder in order to avoid their calculation. The appropriate value of β' is thus derived from the decoded color metadata (e.g. MDCV, CLL).

Figure 9:
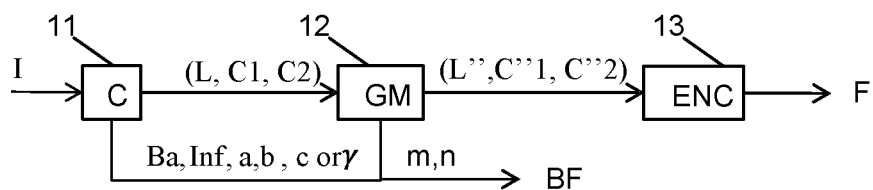
FIG. 9 represents a flowchart of a method for decoding a stream to reconstruct an HDR image according to another specific and non-limiting embodiment.

FIG. 9 represents a flowchart of a method for encoding a HDR picture I in a stream F according to another specific and non-limiting embodiment.

In step 11, a module C obtains a luminance component L and two chrominance components C1 and C2 from a HDR picture I to be encoded. For instance the components (L, C1, C2) may belong to the YUV color space, obtained after applying an OETF on the HDR picture I, and the color components Ec may belong either to a linear RGB or XYZ color space. Step 11 is detailed on FIG. 10.

In step 110, a module IC obtains a component Y that represents the luminance of the HDR picture I by linearly combining together the three components Ec:

$$Y = A_1 \begin{bmatrix} E_1 \\ E_2 \\ E_3 \end{bmatrix}$$

where A1 is the first row of a 3×3 matrix A that defines a color space transforms from the (E1, E2, E3) color space to a color space (Y, C1, C2).

In step 130, a module FM obtains the luminance component L by applying a non-linear function f on the component Y:

$$L = f(Ba, Y) \tag{1}$$

where Ba is a modulation value obtained from the component Y by the module BaM (step 120).

Applying the non-linear function f on the component Y reduces its dynamic range. In other terms, the dynamic of the luminance component L is reduced compared to the dynamic of the component Y.

Basically the dynamic range of the component Y is reduced in order that the luminance values of the component L are represented by using 10 bits.

According to an embodiment, the component Y is divided by the modulation value Ba before applying the non-linear function f:

$$L = f(Y/Ba) \tag{2}$$

According to an embodiment, the non-linear function f is a gamma function:

$$L = B \cdot Y_1^\gamma$$

where $Y_1$ equals either Y or Y/Ba according to the embodiments of eq. (1) or (2), B is a constant value, γ is a parameter (real value strictly below 1).

According to an embodiment, the non-linear function f is a S-Log function:

$$L = a \cdot \ln(Y_1 + b) + c$$

where a, b and c are parameters (real values) of a SLog curve determined such that f(0) and f(1) are invariant, and the derivative of the SLog curve is continuous in 1 when prolonged by a gamma curve below 1. Thus, a, b and c are functions of the parameter γ.

Typical values are shown in Table 1.

TABLE 1

| Y | a | B | c |
|---|---|---|---|
| 1/2.0 | 0.6275 | 0.2550 | 0.8575 |
| 1/2.4 | 0.4742 | 0.1382 | 0.9386 |
| 1/2.8 | 0.3861 | 0.0811 | 0.9699 |

In an advantageous embodiment, a value of γ close to 1/2.5 is efficient in terms of HDR compression performance as well as good viewability of the obtained SDR luma. Thus, the 3 parameters may advantageously take the following values: a=0.44955114, b=0.12123691, c=0.94855684.

According to an embodiment, the non-linear function f is either a gamma correction or a SLog correction according to the pixel values of the component Y.

Applying a gamma correction on the component Y, pulls up the dark regions but does not lower enough high lights to avoid burning of bright pixels.

Then, according to an embodiment, the module FM applies either the gamma correction or the SLog correction according to the pixel values of the component Y. An information data Int may indicate whether either the gamma correction or Slog correction applies.

For example, when the pixel value of the component Y is below a threshold (equal to 1), then the gamma correction is applied and otherwise the SLog correction is applied.

According to an embodiment of the step 120, the modulation value Ba is an average, median, min or max value of the pixel values of the component Y. These operations may be performed in the linear HDR luminance domain $Y_{lin}$ or in a non-linear domain like ln(Y) or $Y^\gamma$ with $\gamma<1$.

According to an embodiment, when the method is used to encode several color pictures belonging to a sequence of pictures, a modulation value Ba is determined for each color picture, a Group of Pictures (GOP) or for a part of a color picture such as, but not limited to, a slice or a Transfer Unit as defined in HEVC.

Figure 10:
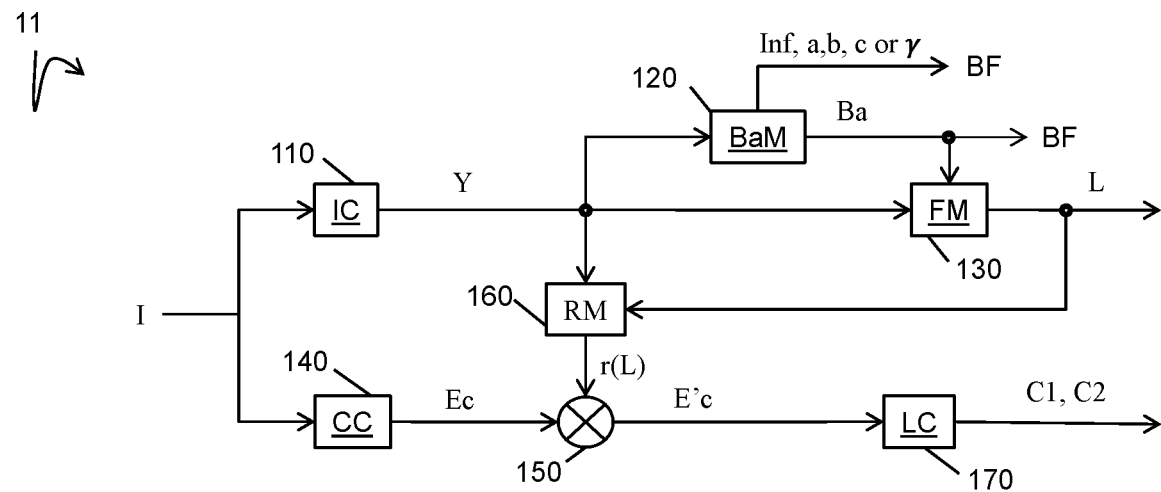
FIGS. 10 and 11 represent in details steps of FIG. 9.

According to an embodiment, the value Ba and/or the parameters of the non-linear function f (such as a, b, c or γ) and/or the information data Inf is (are) stored in a local or remote memory and/or added into a stream BF as illustrated in FIGS. 9 and 10.

In step 140, a module CC obtains at least one color component EC (c=1, 2, 3) from the HDR picture I. A color component Ec may be obtained directly from a local or a remote memory or by applying a color transform on the HDR picture I.

In step 150, an intermediate color component E'c (c=1, 2 or 3) is obtained by scaling each color component Ec by a factor r(L) that depends on the luminance component L:

$$\begin{cases} E'_1(i) = E_1(i) * r(L(i)) \\ E'_2(i) = E_2(i) * r(L(i)) \\ E'_3(i) = E_3(i) * r(L(i)) \end{cases}$$

where r(L(i)) is a factor (real value), determined by the module RM (step 160), that depends on the value of a pixel i of the component L, $E'_c(i)$ is the value of the pixel i of the intermediate color component E'c, and $E_c(i)$ is the value of the pixel i of the color component Ec.

Scaling by a factor means multiplying by the factor or dividing by the inverse of the factor.

Scaling each color component Ec by the factor r(L) that depends on the luminance component L preserves the hue of the colors of the HDR picture I.

According to an embodiment of the step 160, the factor r(L) is the ratio of the luminance component L over the component Y:

$$r(L(i)) = \frac{L(i)}{Y(i)}$$

with Y(i) being the value of a pixel i of the component Y. Actually, the value Y(i) of a pixel of the component Y depends non-ambiguously on the value L(i) of a pixel of the luminance component L, such that the ratio can be written as a function of L(i) only.

This embodiment is advantageous because scaling each color component Ec by the factor r(L) that further depends on the component Y preserves the hue of the colors of the HDR picture I and thus improves the visual quality of the decoded color picture.

More precisely, in colorimetry and color theory, colorfulness, chroma, and saturation refer to the perceived intensity of a specific color. Colorfulness is the degree of difference between a color and gray. Chroma is the colorfulness relative to the brightness of another color that appears white under similar viewing conditions. Saturation is the colorfulness of a color relative to its own brightness.

A highly colorful stimulus is vivid and intense, while a less colorful stimulus appears more muted, closer to gray. With no colorfulness at all, a color is a "neutral" gray (a picture with no colorfulness in any of its colors is called grayscale). Any color can be described from its colorfulness (or chroma or saturation), lightness (or brightness), and hue.

The definition of the hue and saturation of the color depends on the color space used to represent the color.

For example, when a CIELUV color space is used, the saturation $s_{uv}$ is defined as the ratio between the chroma over the luminance L*.

$$s_{uv} = \frac{C^*_{uv}}{L^*} = \frac{\sqrt{u^{*2} + v^{*2}}}{L^*}$$

The hue is then given by $$h_{uv} = \arctan\frac{v^*}{u^*}$$

According to another example, when a CIELAB color space is used, the saturation is defined as the ratio of the chroma over the luminance:

$$s_{ab} = \frac{C^*_{ab}}{L^*} = \frac{\sqrt{a^{*2} + b^{*2}}}{L^*}$$

The hue is then given by $$h_{ab} = \arctan\frac{b^*}{a^*}$$

These equations are a reasonable predictor of saturation and hue that are in agreement with the human perception of saturation, and demonstrate that adjusting the brightness in CIELAB (or CIELUV) color space while holding the angle a*/b* (or u*/v*) fixed does affect the hue and thus the perception of a same color. In step 150, scaling the color components Ec by a same factor preserves this angle, thus the hue.

Now let us consider that the HDR picture I is represented in the CIELUV color space and a picture I2 that is formed by combining together the luminance component L, whose dynamic range is reduced compared to the dynamic range of the luminance of the HDR picture I (step 130), and two chrominance components U (=C1) and V (=C2) of the CIELUV color space. The colors of the picture I2 are thus differently perceived by a human being because the saturation and the hue of the colors changed. The method (step 150) determines the chrominance components C1 and C2 of the picture I2 in order that the hue of the colors of the picture I2 best match the hue of the colors of the HDR picture I.

According to an embodiment of the step 160, the factor r(L) is given by:

$$r(L(i)) = \frac{\max\{5, L(i)\}}{2048\max\{0.01, Y(i)\}}$$

This last embodiment is advantageous because it prevents the factor from going to zero for very dark pixels, i.e. allows the ratio to be invertible regardless of the pixel value.

In step 170, the two chrominance components C1, C2 are obtained from the at least one intermediate color components E'c.

In a specific embodiment, intermediate components are obtained from E'c as follows $$\begin{cases} D_1 = \sqrt{E_1'} \\ D_2 = \sqrt{E_2'} \\ D_3 = \sqrt{E_3'} \end{cases}$$

The two chrominance components C1 and C2 are then obtained by linearly combining the three intermediate components Dc, c∈{1,2,3}:

$$\begin{bmatrix} C_1 \\ C_2 \end{bmatrix} = \begin{bmatrix} A_2 \\ A_3 \end{bmatrix} \begin{bmatrix} D_1 \\ D_2 \\ D_3 \end{bmatrix}$$

where A2 and A3 are the second and third rows of a 3×3 matrix A that defines a color space transforms from the (E1, E2, E3) color space to a color space (Y, C1, C2).

In step 12, a module GM maps the luminance L and chrominance C1, C2 components onto a final luminance component L" and two final chrominance components C"1, C"2 so that the gamut G2 of colors obtained from the final luminance (L") and chrominance (C"1, C"2) components maps onto the gamut G1 of the colors of the HDR picture I to be encoded. The step 12 is detailed on FIG. 11. The two final chrominance components C"1, C"2 are obtained by scaling (step 121) each of the two chrominance components C1, C2 by a factor $\beta^{-1}(L(i))$ that depends on the value of each pixel i of the luminance component L, and a module LCC (step 122) obtains the final luminance component L" by linearly combining together the luminance component L and the two final chrominance components C"1, C"2:

$$\begin{cases} L'' = L - mC_1'' - nC_2'' \\ C_1'' = \beta^{-1}(L(i)) * C_1 \\ C_2'' = \beta^{-1}(L(i)) * C_2 \end{cases} \quad (A)$$

where m and n are coefficients (real values) that avoid color saturation by correcting the highest luminance peaks.

According to a variant, the factor $\beta^{-1}(L(i))$ further depends on a modulation value Ba.

Figure 11:
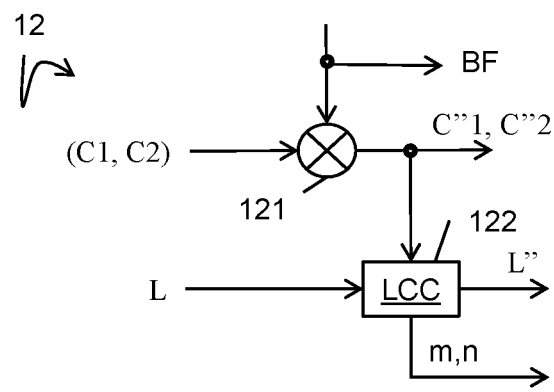

According to an embodiment, the coefficients m and n are stored in either a local or remote memory and/or added to a stream BF as illustrated in FIG. 11.

According to a variant of the module LCC (equation A), the values of the final luminance component L" are always lower than the values of the luminance component L:

$$L''=L-\max(0, mC''_1+nC''_2)$$

This ensures that the values of the final luminance component L" do not exceed the values of the luminance component L and thus ensures that no color saturation occurs.

According to an embodiment, the factor $\beta^{-1}(L(i))$ is obtained from a Look-Up-Table (LUT) for a specific luminance value L(i), and optionally further for a specific modulation value Ba and. Thus, for multiple luminance peak values (e.g. maximum luminance of the mastering display) such as for example, 1000, 1500 and 4000 nits, a specific factor $\beta^{-1}(L(i))$ is stored in a LUT for each specific modulation value Ba.

According to a variant, the factor $\beta^{-1}(L(i))$ is obtained for a value of a pixel of the luminance component L by interpolating the luminance peaks between the multiple luminance peaks for which LUT are stored.

According to a variant, the factor $\beta^{-1}(L(i))$ for a specific modulation value Ba is obtained for a value of a pixel of the luminance component L by interpolating the luminance peaks between the multiple luminance peaks for which LUT are stored.

According to an embodiment, the factor $\beta^{-1}(L(i))$ and the coefficients m and n in equation (A) are obtained as follows.

Mapping the gamut G2 of the colors obtained from the final luminance (L") and chrominance (C"1, C"2) components onto the gamut G1 of the colors of the HDR picture I (obtained from the components L, C1 and C2) is given by:

$$\begin{bmatrix} L'' \\ C_1'' \\ C_2'' \end{bmatrix} = \Phi_{Ba}(Y) \begin{bmatrix} L \\ C_1 \\ C_2 \end{bmatrix} \quad (B)$$

where $\Phi_{Ba}(Y)$ is a mapping function depending on the linear luminance Y of the HDR picture I. Typically, the linear luminance Y is obtained as a linear combination of the components Ec of the HDR picture I. The luminance component L is related unambiguously to the linear luminance Y and the backlight value Ba, such that one may write $$\Phi_{Ba}(Y)=\Phi_{Ba}(f(Ba, Y))=\Phi_{Ba}(L)$$

and the mapping function is seen as a function of the luminance component L.

Now, let us fix a modulation value Ba and a specific linear luminance level $Y_0$. Let us suppose that the color components Ec are expressed in the linear RGB color space. The associated three primaries $R_{Y_0}$, $G_{Y_0}$, $B_{Y_0}$ of the gamut G2 are given by $$R_{Y_0} = \begin{bmatrix} Y_0/A_{11} \\ 0 \\ 0 \end{bmatrix}, G_{Y_0} = \begin{bmatrix} 0 \\ Y_0/A_{12} \\ 0 \end{bmatrix}, R_{Y_0} = \begin{bmatrix} 0 \\ 0 \\ Y_0/A_{13} \end{bmatrix} \quad (C)$$

where A1 is the one-row matrix that defines the linear luminance Y from the linear RGB, i.e.

$$Y = A_1 \begin{bmatrix} E_1 \\ E_2 \\ E_3 \end{bmatrix}.$$

Let denote S a 3×3 matrix made of the images $\mu(.)$, corresponding to the application the module C (step 11), of these three primaries:

$$S_{Y_0} = [\mu(R_{Y_0}) \mu(G_{Y_0}) \mu(B_{Y_0})].$$

The purpose of the mapping function $\Phi_{Ba}(L)$ is to map back $S_{Y_0}$ onto the three primaries of the gamut G2. In other words, the matrix $S_{Y_0}$ should be under the form:

$$A \begin{bmatrix} r & 0 & 0 \\ 0 & g & 0 \\ 0 & 0 & b \end{bmatrix}$$

where r,g,b are unknown parameters and A is the 3×3 matrix that transforms the non-linear color space R'G'B' into the color space of LC1C2. All put together, one gets:

$$\Phi_{Ba}(L) S_{Y_0} = A \begin{bmatrix} r & 0 & 0 \\ 0 & g & 0 \\ 0 & 0 & b \end{bmatrix} = AD$$

Also, the preservation of the white point, whose coordinates are [1 0 0] in the color space of LC1C2, leads to another condition:

$$\begin{bmatrix} \eta \\ 0 \\ 0 \end{bmatrix} = \Phi_{Ba}(L) \begin{bmatrix} 1 \\ 0 \\ 0 \end{bmatrix} = ADS_{Y_0}^{-1} \begin{bmatrix} 1 \\ 0 \\ 0 \end{bmatrix}$$

where $\eta$ is another unknown parameter. As a consequence, the matrix D is uniquely determined by:

$$\text{diag}(D) = \eta A^{-1} \begin{bmatrix} 1 \\ 0 \\ 0 \end{bmatrix} \Big/ S_{Y_0}^{-1} \begin{bmatrix} 1 \\ 0 \\ 0 \end{bmatrix} \quad (D)$$

where the division is understood as the coefficient division of the first column of $A^{-1}$ by the first column of $S_Y^{-1}$. As a consequence, the mapping matrix is determined up to a scaling factor $\eta$.

The inverse of the mapping function $\Phi_{Ba}(L)$, required at the decoding side, is not easily obtained because it requires solving an implicit non-linear problem in L, because one gets easily the inverse matrix $\Phi_{Ba}^{-1}(L)$ as a function of the luminance component L, but not its counter part $\Phi_{Ba}^{-1}(L'')$ as a function of final luminance component L''. We show that the formulation of $\Phi_{Ba}(L)$ can be further simplified in order to obtain a simple inverse $\Phi_{Ba}^{-1}(L'')$.

Actually, the mapping function may be expressed by:

$$\Phi_{Ba}(L) = \begin{bmatrix} \eta & -m\beta^{-1}(Ba, L(i)) & -n\beta^{-1}(Ba, L(i)) \\ 0 & \beta^{-1}(Ba, L(i)) & 0 \\ 0 & 0 & \beta^{-1}(Ba, L(i)) \end{bmatrix} \quad (E)$$

where m and n are coefficients (real values) that depend on the luminance level $Y_0$. The inverse $\Phi_{Ba}^{-1}(L)$ of the mapping function $\Phi_{Ba}(L)$ is given by:

$$\Phi_{Ba}^{-1}(L) = SD^{-1}A^{-1} \quad (F)$$

with its first column given by $$\Phi_{Ba}^{-1}(L)_{col1} = \eta^{-1} \begin{bmatrix} 1 \\ 0 \\ 0 \end{bmatrix}$$

Following some algebraic manipulations, one shows that equation (F) becomes $$\Phi_{Ba}^{-1}(L) = \eta^{-1} \begin{bmatrix} 1 & m & n \\ 0 & \beta & 0 \\ 0 & 0 & \beta \end{bmatrix},$$

leading to the mapping function $$\Phi_{Ba}(L) = \Phi_0 \begin{bmatrix} \eta & 0 & 0 \\ 0 & \eta\beta^{-1} & 0 \\ 0 & 0 & \eta\beta^{-1} \end{bmatrix}, \quad (G)$$

where m and n are real values (coefficients) that do not depend on the modulation value Ba and the luminance component L, $\beta = \beta(Ba, L(i))$ and one has defined the fixed matrix $$\Phi_0 = \begin{bmatrix} 1 & m & n \\ 0 & 1 & 0 \\ 0 & 0 & 1 \end{bmatrix}$$

Equations (B) and (G) show that the mapping function has two effects: first, the dynamic of the luminance component L is scaled by a scaling factor $\eta$ and, second, the chrominance components C1 and C2 are also scaled by a scaling factor $\eta\beta^{-1}$.

In order to preserve the global luminance mapping between L and L'', the parameter $\eta$ is set to one. Equation (G) becomes:

$$\Phi_{Ba}(L) = \Phi_0 \begin{bmatrix} 1 & 0 & 0 \\ 0 & \beta^{-1}(Ba, L(i)) & 0 \\ 0 & 0 & \beta^{-1}(Ba, L(i)) \end{bmatrix} \quad (H)$$

where $\beta$ does depend on the modulation value Ba and the luminance component. This formula is inverted to get the inverse mapping function $$\Phi_{Ba}^{-1}(L'') = \begin{bmatrix} 1 & 0 & 0 \\ 0 & \beta(Ba, L(i)) & 0 \\ 0 & 0 & \beta(Ba, L(i)) \end{bmatrix} \Phi_0^{-1} \quad (I)$$

Here, the luminance component L is obtained back from L", C"1, C"2 by applying the matrix $\Phi_0^{-1}$ and then, since L is known, one finds the factor $\beta(Ba, L(i))$ to apply to the final chrominance components C"1, C"2 to get the chrominance components C1, C2 back.

The mapping function $\Phi_{Ba}(L)$ is then provided by equation (H) where the constant matrix $\Phi_0$ is used for all luminance level up to the luminance peak P of the color image I, and $\beta$ defined on the full range of luminance up to the luminance peak P.

Including equation (H) in equation (B) leads to equation (A).

According to another embodiment, the factor $\beta^{-1}(Ba, L(i), m, n)$ is considered as depending also on the coefficients m and n which are given as explained in the previous embodiment.

The factor $\beta^{-1}$ is thus the single unknown value in step 12.

The factor $\beta^{-1}$ is obtained such that a gamut distortion calculated between the gamuts G1 and G2 is minimized. In other words, the factor $\beta^{-1}$ is the optimal factor under the condition of gamut preservation.

Mathematically speaking, the factor $\beta^{-1}$ is obtained by:

$$\beta^{-1}(Ba_0, L_0, m, n) = \mathrm{argmin}_{\beta_{test}^{-1}} GD(\beta_{test}^{-1}),$$

where $Y_0$ is a given luminance value from which is deduced a luminance value $L_0$, $Ba_0$ is a given modulation value given and the gamut distortion $GD(\beta_{test}^{-1})$ is given by:

$$GD(\beta_{test}^{-1}) = \sum_j (x_j - x'_j)^2 + (y_j - y'_j)^2$$

in which the gamut distorsion is defined by the sum of the square error between an element (xj,yj) of the gamut G1 and an associated element (x'j,y'j) of the gamut G2.

Let us fix a luminance value Y0. One obtains the corresponding XYZ values of each element of the set by $$X_j = Y_0 x_j / y_j, \quad Y_j = Y_0 \text{ and } Z_j = Y_0 (1 - x_j - y_j) / y_j.$$

and then the corresponding color values Ec (c=1, 2, or 3). Let us fix and impose a modulation value Ba0 and a test factor $\beta_{test}^{-1}$ used for $\beta^{-1}(Ba_0, L_0, m, n)$ at step 121.

One obtains the final values L"j, C"1j and C"2j by applying the coding chain, made of steps 11 and 12 to the color components. From these final values, one deduces the associated gamut set of associated element (x'j,y'j) in the CEI 1931 diagram.

In step 13, an encoder ENC encodes the final luminance L" component and the two final chrominance components C"1, C"2 in a stream F, e.g. an HEVC compliant stream.

According to an embodiment, the encoded component L" and chrominance components C"1, C"2 are stored in a local or remote memory and/or added into a stream F.

Figure 12:
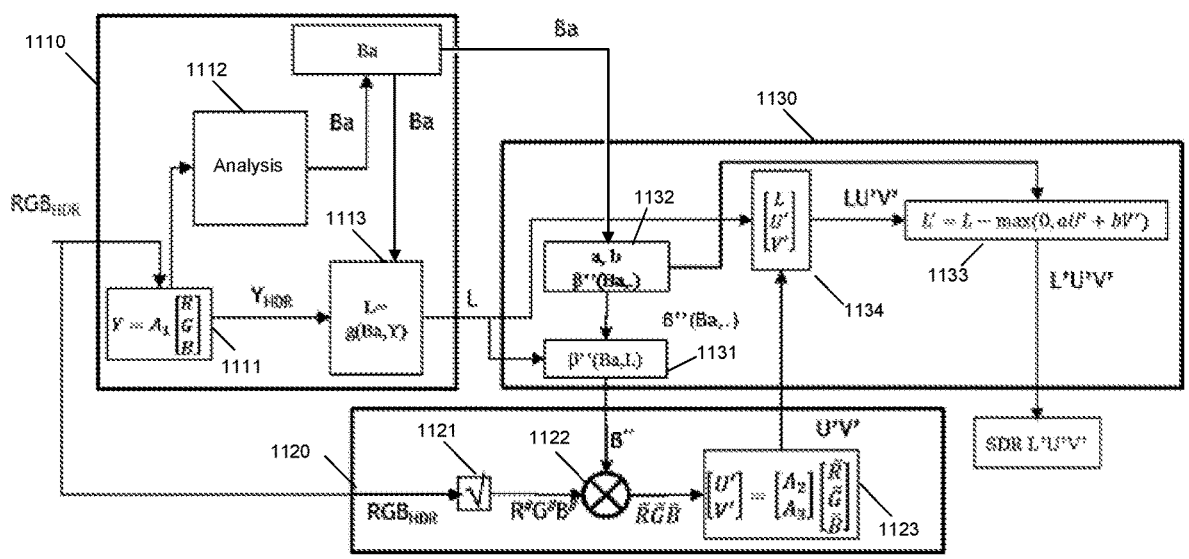
FIG. 12 represents a flowchart of a method for encoding an HDR picture in a stream according to another specific and non-limiting embodiment.

FIG. 12 represents a flowchart of a method for encoding an HDR picture in a stream according to another specific and non-limiting embodiment. This encoding method depends on a set of two-variable functions $\beta''(Ba,L)$ and $g(Ba,L)$ and of two constant parameters a and b that are used for the mapping from SDR to HDR of the luminance and the chrominance such that colors, as well as texture, are preserved in the SDR image/video compared to the original HDR image/video. While $g(Ba,L)$ is preferably a Slog function in the variable L, the triplet (a, b, $\beta''$) is optimized to lead to the best possible SDR/HDR color matching (hue and perceived saturation) depending on the peak luminance, the input/output gamut's, and the backlight value Ba.

The encoding involves the function $\beta''(Ba,L)$, and the decoding involves the function $\beta'(Ba,L)$. The function $\beta''$ is usually optimized on the encoder side. On the decoder side the functions $\beta'$ are usually stored as Look-Up Tables that indexed by the peak luminance, the input/output gamut's, and possibly the backlight value Ba.

The encoding method comprises a luminance dynamic reduction step 1110. The step 1110 comprises a sub-step 1111 of obtaining an original luminance Y from at least one of color components Ec (c=1,2,3) of the HDR picture and a sub-step 1112 of histogram analysis in order to determine a modulation value (also called backlight value) Ba for the picture to be encoded. Different methods can be used to calculate the modulation value, for example, but not limited to, using an average, median, minimum or maximum value of the HDR luminance. These operations may be performed in the linear HDR luminance domain $Y_{HDR,lin}$ or in a non-linear domain like $\ln(Y_{HDR,lin})$ or $Y_{HDR,lin}^{\gamma}$ with $\gamma<1$.

A color picture is considered as having three color components in which the pixel values of the color picture are represented. The present disclosure, although at least partly explained by way of concrete example, is not limited to any color space in which the three components are represented but extends to any color space such as RGB, CIELUV, XYZ, CIELab, etc. As an example, Ec refers to $RGB_{HDR}$ in the Figures. In a sub-step 1113, the dynamic of the original luminance Y dynamic is reduced to obtain a luminance component L from the original luminance Y and the modulation value Ba by applying a non-linear function that depends on from the original luminance Y and the modulation value Ba. The luminance component L is a luminance component of the SDR picture, therefore it can also be referred to as a Y component, more precisely as a $Y_{SDR}$ component of a YUV BT709 or YUV BT2020 standard color space.

In step 1120, two chrominance components C1 and C2 are determined from the color components RGBHDR of the color picture. In a sub-step 1121, intermediate components R#B#G# are obtained by taking the square root of the color components $RGB_{HDR}$. In a next sub-step 1122, reduced components $\tilde{R}\tilde{G}\tilde{B}$ are obtained by a multiplication of the intermediate components R#B#G# by a common multiplicative factor $\beta''$. The factor $\beta''(Ba,L)$ depends on the luminance component L and the modulation value Ba. In a next sub-step 1123, chrominance components U' and V' are obtained by multiplying the three reduced components Fc by a matrix, i.e.

$$[U';V'] = M[\tilde{R}\tilde{G}\tilde{B}]$$

where M is a 2×3 matrix that depends on the gamut of the color picture.

In step 1130, a correction of the luminance component L and the chrominance components C1, C2 is performed to obtain the corrected luminance component L' and the corrected chrominance components U' and V'. This correction obtained by a gamut mapping such that the perceived colors of the gamut G1 of the corrected components L', U', V' correspond to the perceived color of the gamut G2 of the components of the HDR picture.

More precisely, in colorimetry and color theory, colorfulness, chroma, and saturation refer to the perceived intensity of a specific color. Colorfulness is the degree of difference between a color and gray. Chroma is the colorfulness relative to the brightness of another color that appears white under similar viewing conditions. Saturation is the colorfulness of a color relative to its own brightness.

A highly colorful stimulus is vivid and intense, while a less colorful stimulus appears more muted, closer to gray. With no colorfulness at all, a color is a "neutral" gray (a picture with no colorfulness in any of its colors is called grayscale). Any color can be described from its colorfulness (or chroma or saturation), lightness (or brightness), and hue.

The definition of the hue and saturation of the color depends on the color space used to represent the color.

For example, when a CIELUV color space is used, the saturation $s_{uv}$ is defined as the ratio between the chroma over the luminance L*.

$$s_{uv} = \frac{C^*_{uv}}{L^*} = \frac{\sqrt{u^{*2} + v^{*2}}}{L^*}$$

The hue is then given by $$h_{uv} = \arctan\frac{v^*}{u^*}$$

According to another example, when a CIELAB color space is used, the saturation is defined as the ratio of the chroma over the luminance:

$$s_{ab} = \frac{C^*_{ab}}{L^*} = \frac{\sqrt{a^{*2} + b^{*2}}}{L^*}$$

The hue is then given by $$h_{ab} = \arctan\frac{b^*}{a^*}$$

These equations are a reasonable predictor of saturation and hue that are in agreement with the human perception of saturation, and demonstrate that adjusting the brightness in CIELAB (or CIELUV) color space while holding the angle a*/b* (or u*/v*) fixed does affect the hue and thus the perception of a same color.

Now let us consider that the HDR color picture is represented in the CIELUV color space and a picture I2 that is formed by combining together the luminance component L, whose dynamic range is reduced compared to the dynamic range of the luminance of the HDR picture I, and two chrominance components U (=C1) and V (=C2) of the CIELUV color space. The colors of the picture I2 are thus differently perceived by a human being because the saturation and the hue of the colors changed. The method (step 1130) determines the chrominance components C'1 and C'2 of a corrected picture I3 in order that the hue of the colors of the corrected picture I3 best match the hue of the colors of the HDR color picture.

In a sub-step 1131, 1132, the common multiplicative factor β" used in the second step 1120 is determined. In a next sub-step 1133, L' is generated from L.

The corrected components L', C'1, C'2 are obtained from the luminance component L and the chrominance components C1, C2 by the following equations $$C'1 = C1,$$

$$C'2 = C2,$$

$$L' = L - mC'1 - nC'2$$

where m and n are two real coefficients and refer to a and b in the Figure. The real coefficients depend on the gamut of the HDR Rec BT.709 and Bt.2020). Typical values for m and n are m≈n in the interval [0.1,0.5].

According to a variant of the correction, the values of the corrected luminance component L' are always lower than the values of the luminance component L:

$$L' = L - \max(0, mC'_1 + nC'_2)$$

This ensures that the values of the corrected luminance component L' do not exceed the values of the luminance component L and thus ensures that no color saturation occurs. The modulation value Ba is encoded in the bitstream F as well as the SDR picture L'C'1C'2, i.e. L'U'V' on the FIG. 1.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for decoding a stream coding a standard dynamic range picture obtained from a high dynamic range picture comprising:
   obtaining a decoded standard dynamic range picture and color metadata associated in the stream with the coded standard dynamic range picture, wherein the color metadata comprises at least a maximum display luminance of a mastering display used in mastering said high dynamic range picture;
   inverse mapping a luma signal of the decoded standard dynamic range picture responsive to said maximum display luminance of said mastering display in order to obtain a high dynamic range luminance signal;
   performing color correction of a chroma signal of said decoded standard dynamic range picture responsive at least to said maximum display luminance of said mastering display to obtain a corrected chroma signal; and
   reconstructing said high dynamic range picture from said obtained high dynamic range luminance signal and said corrected chroma signal.

2. The method of claim 1, wherein said color metadata further comprises color primaries and a white point of said mastering display.

3. The method of claim 1, wherein reconstructing said high dynamic range picture further comprises an inverse color mapping of the decoded standard dynamic range picture responsive to at least one of color primaries and white point of said mastering display.

4. The method according to claim 1, further comprising:
   obtaining an inverse correction factor based on said maximum display luminance, said inverse correction factor depending on a luma signal of said decoded standard dynamic range picture, wherein said color correction of said chroma signal is based on said inverse correction factor.

5. A coding method for coding a high dynamic range picture comprising:
   obtaining color metadata comprising at least a maximum display luminance of a mastering display used in mastering the high dynamic range picture;
   determining a standard dynamic range picture from the high dynamic range picture by mapping a luminance signal of the high dynamic range picture into a luma signal of the standard dynamic range picture responsive said maximum display luminance and by mapping a color signal of said high dynamic range picture into a chroma signal of said standard dynamic range picture responsive at least to said maximum display luminance of said mastering display;
   encoding in a stream the standard dynamic range picture and the color metadata.

6. The method according to claim 5, wherein said color metadata further comprises color primaries and a white point of said mastering display.

7. The method according to claim 5, wherein determining a standard dynamic range picture from the high dynamic range picture further comprises a color mapping of the color signal of the high dynamic range picture into a chroma signal of the standard dynamic range picture responsive to at least one of color primaries and white point of the mastering display.

8. The method according to claim 5, further comprising:
   adjusting said luma signal of said standard dynamic range picture with said chroma signal of said standard dynamic range picture, responsive at least to said maximum display luminance of said mastering display.

9. A decoding device for decoding a stream coding a standard dynamic range picture obtained from a high dynamic range picture, said device comprising at least a processor configured to:
   obtain a decoded standard dynamic range picture and color metadata associated in the stream with the coded standard dynamic range picture, wherein the color metadata comprises at least a maximum display luminance of a mastering display used in mastering said high dynamic range picture;
   inverse mapping inverse map a luma signal of the decoded standard dynamic range picture responsive to said maximum display luminance of said mastering display in order to obtain a high dynamic range luminance signal;
   perform color correction of a chroma signal of said decoded standard dynamic range picture responsive at least to said maximum display luminance of said mastering display to obtain a corrected chroma signal; and
   reconstruct said high dynamic range picture from said obtained high dynamic range luminance signal and said corrected chroma signal.

10. The decoding device of claim 9, wherein said color metadata further comprises color primaries and a white point of said mastering display.

11. The decoding device of claim 9, wherein reconstructing said high dynamic range picture further comprises an inverse color mapping of the decoded standard dynamic range picture responsive to at least one of color primaries and white point of said mastering display.

12. The decoding device according to claim 9, wherein the at least a processor is further configured to:
obtain an inverse correction factor based on said maximum display luminance, said inverse correction factor depending on a luma signal of said decoded standard dynamic range picture, wherein said color correction of said chroma signal is based on said inverse correction factor.

13. A coding device for coding a high dynamic range picture comprising at least a processor configured to:
obtain color metadata comprising at least a maximum display luminance of a mastering display used in mastering the high dynamic range picture;
determine a standard dynamic range picture from the high dynamic range picture by mapping a luminance signal of the high dynamic range picture into a luma signal of the standard dynamic range picture responsive said maximum display luminance and by mapping a color signal of said high dynamic range picture into a chroma signal of said standard dynamic range picture responsive at least to said maximum display luminance of said mastering display;
encode, in a stream, the standard dynamic range picture and the color metadata.

14. The coding device according to claim 13, wherein said color metadata further comprises color primaries and a white point of said mastering display.

15. The coding device according to claim 13, wherein determining a standard dynamic range picture from the high dynamic range picture further comprises a color mapping of the color signal of the high dynamic range picture into a chroma signal of the standard dynamic range picture responsive to at least one of color primaries and white point of the mastering display.

16. The coding device according to claim 13, wherein the at least a processor is further configured to:
adjust said luma signal of said standard dynamic range picture with said chroma signal of said standard dynamic range picture, responsive at least to said maximum display luminance of said mastering display.

17. A non-transitory computer readable storage medium having stored thereon a stream comprising coded data representative of a standard dynamic range picture determined from a high dynamic range picture by mapping a luminance signal of the high dynamic range picture into a luma signal of the standard dynamic range picture responsive to a maximum display luminance of a mastering display used in mastering said high dynamic range picture and by mapping a color signal of said high dynamic range picture into a chroma signal of said standard dynamic range picture responsive at least to said maximum display luminance of said mastering display, and coded data representative of color metadata associated with the standard dynamic range picture, wherein said color metadata comprises at least said maximum display luminance.

18. The non-transitory computer readable storage medium according to claim 17, wherein said color metadata further comprises color primaries and a white point of said mastering display.

19. The non-transitory computer readable storage medium according to claim 17, wherein determining a standard dynamic range picture from the high dynamic range picture further comprises a color mapping of the color signal of the high dynamic range picture into a chroma signal of the standard dynamic range picture responsive to at least one of color primaries and white point of the mastering display.

20. The non-transitory computer readable storage medium according to claim 17, wherein the color metadata are encapsulated in a Mastering Display Color Volume SEI message associated with the standard dynamic range picture.

21. The non-transitory computer readable storage medium according to claim 17, wherein the characteristics of the mastering display identify a color volume of the mastering display.

* * * * *

UNITED STATES PATENT AND TRADEMARK OFFICE
CERTIFICATE OF CORRECTION

PATENT NO. : 11,032,579 B2
APPLICATION NO. : 16/086240
DATED : June 8, 2021
INVENTOR(S) : Pierre Andrivon et al.

It is certified that error appears in the above-identified patent and that said Letters Patent is hereby corrected as shown below:

In the Claims

Column 26, Line 50, Claim 9, "inverse mapping inverse map" should read -- inverse map --

Signed and Sealed this
Twenty-third Day of January, 2024

Katherine Kelly Vidal
*Director of the United States Patent and Trademark Office*